Figure 3:
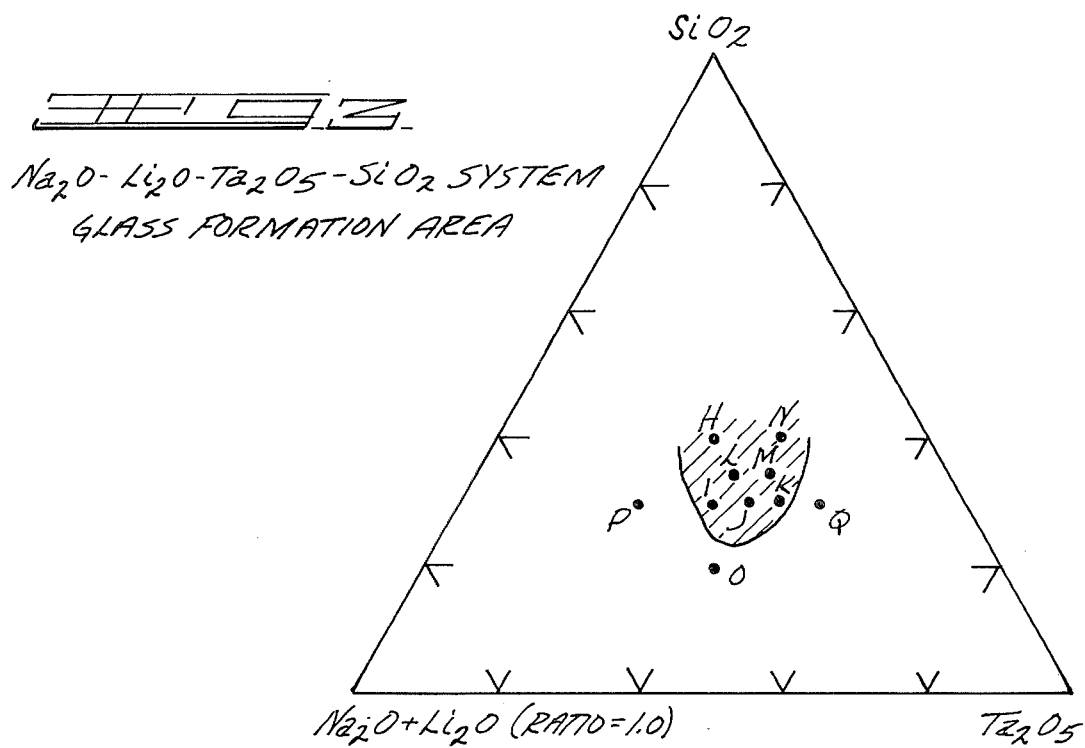

United States Patent [19]

Rapp

[11] 4,017,317
[45] Apr. 12, 1977

[54] GLASS-CERAMICS AND PROCESS FOR MAKING SAME

[75] Inventor: James R. Rapp, Toledo, Ohio
[73] Assignee: Owens-Illinois, Inc., Toledo, Ohio
[22] Filed: May 10, 1976
[21] Appl. No.: 684,615

Related U.S. Application Data

[62] Division of Ser. No. 169,217, Aug. 5, 1971, Pat. No. 3,984,251.

[52] U.S. Cl. .................................. 106/39.6; 106/52
[51] Int. Cl.² ..................... C03C 3/04; C03C 3/22
[58] Field of Search .......................... 106/52, 39.6

[56] References Cited

UNITED STATES PATENTS

| | | | |
|---|---|---|---|
| 3,006,776 | 10/1961 | Geffchen | 106/54 |
| 3,113,877 | 12/1963 | Janakuamo-Rao | 106/39.6 |
| 3,114,066 | 12/1963 | Allen et al. | 106/39.6 |
| 3,529,980 | 9/1970 | Bromen et al. | 106/47 Q |
| 3,573,939 | 4/1971 | Beall | 106/39.7 |

*Primary Examiner*—Patrick P. Garvin
*Assistant Examiner*—Mark Bell
*Attorney, Agent, or Firm*—Charles S. Lynch; E. J. Holler

[57] ABSTRACT

Thermally crystallizable glasses of the $Na_2O$—$Ta_2O_5$—$SiO_2$ and the $Na_2O$—$Li_2O$—$Ta_2O_5$-$SiO_2$ systems, and glass-ceramics made therefrom which are highly transparent, have high indices of refraction, and excellent strength properties. By varying the heat treatment schedule for crystallization of a glass to a glass-ceramic, a specific high index of refraction coming within a prescribed range may be imparted to the finished transparent glass-ceramic. A transparent glass-ceramic having two or more different indices of refraction may also be produced.

11 Claims, 4 Drawing Figures

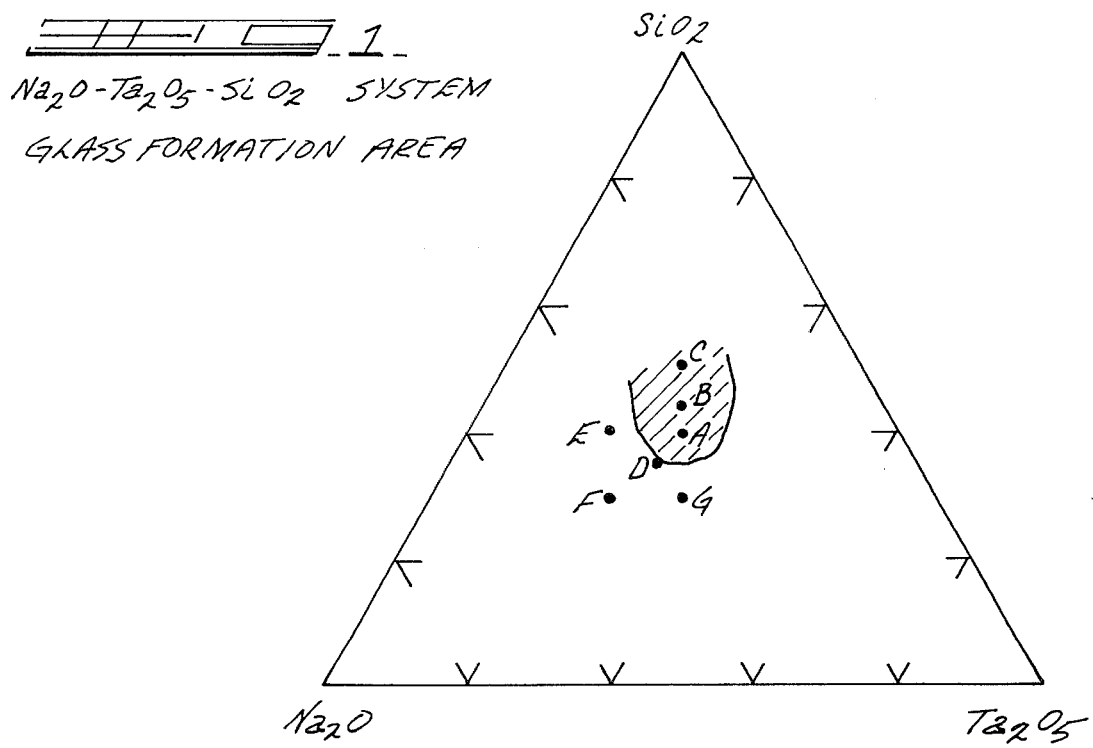
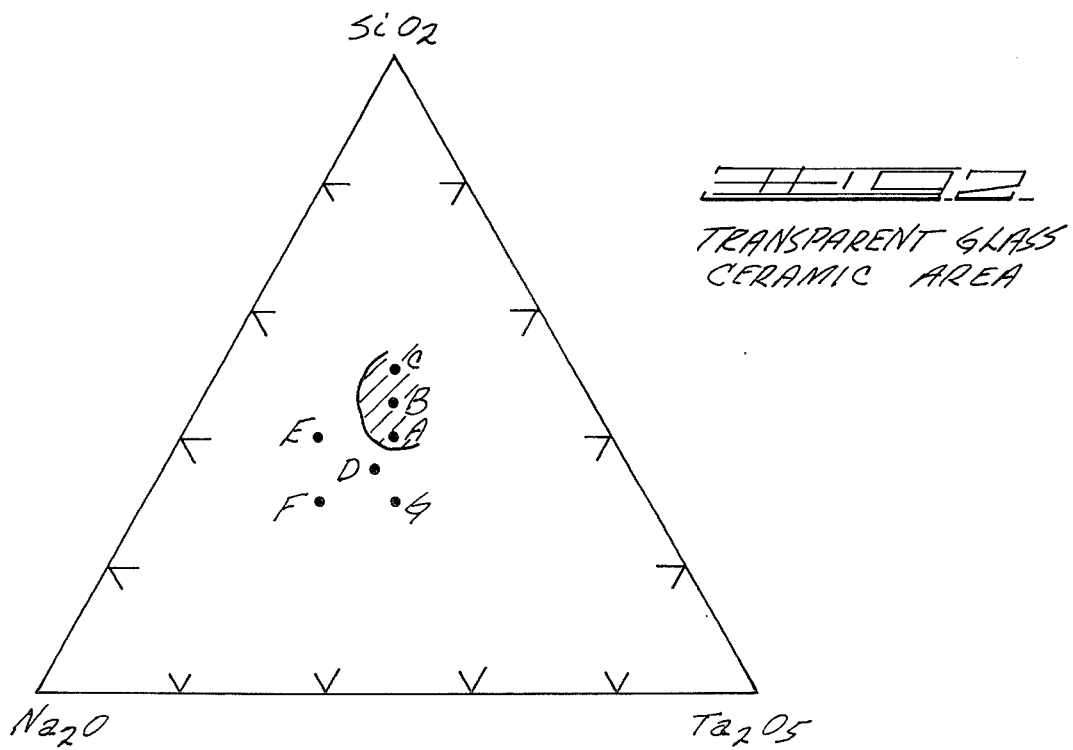

$Na_2O-Li_2O-Ta_2O_5-SiO_2$ SYSTEM GLASS FORMATION AREA

TRANSPARENT GLASS CERAMIC AREA

GLASS-CERAMICS AND PROCESS FOR MAKING SAME

REFERENCE TO A RELATED APPLICATION

This application is a division of my copending U.S. Pat. application Ser. No. 169,217 filed Aug. 5, 1971 now U.S. Pat. No. 3,984,251

With the advent of acoustooptical devices, electrooptical devices, and other devices utilizing transparent glasses and glass ceramics, the need for glasses and glass-ceramics having a high index of refraction is becoming more acute. However, it is well-known that the higher the index of refraction of a glass, the more difficult it is to obtain it in optical quality (freedom from bubbles, stones and cords). This is especially true when the index of refraction is about 1.8 or higher.

Acoustooptical devices (sometimes called elastooptical devices) are known in the art and reference is made to an article entitled "A Review of Acousto-optical Deflection and Modulation Devices" by E. I. Gordon, which appeared in the Proceedings of the I.E.E.E. [10] 1391–1402 (1966) and an article entitled "Dielectric Materials for Electrooptic, Elastooptic and Ultrasonic Device Application" by E. G. Spencer et al., appearing in the Proceedings of the I.E.E.E., 55 [12] 2074–2108 (1967).

Electrooptical devices are also well-known and are described in U.S. Pat. No. 3,069,973 to I. Ames and in U.S. Pat. No. 3,467,463 to N. F. Borrelli et al.

While single crystal materials are of high quality and can be used in acoustooptical and electrooptical devices, they are relatively very expensive to obtain, especially in large sizes and moreover one is limited to the precise index of refraction inherent in any particular single crystal.

The present invention is directed to certain limited compositions having specific parameters and coming within the broad definition of alkali—$Ta_2O_5$—$SiO_2$ systems which can be readily formed into glasses and the glasses subsequently thermally in situ crystallized to form transparent glass-ceramics having selected high indices of refraction. Such glass-ceramics can be formed from the crystallizable glasses even though the glasses do not have any of the customary nucleating agents, such as $TiO_2$, $ZrO_2$, $P_2O_5$, and the like. Glasses and glass-ceramics of this invention are suitable for use in electrooptical devices, acoustooptical devices, and the like, for example as modulators, laser Q-switches and/or deflectors, etc. Certain of such glasses and/or glass-ceramics have been found to also have good dielectric properties including very low dielectric losses, which make them suitable for use in a variety of electrical devices, such as capacitors, electroluminescent cells, wave guides, and the like. Dielectric constants of at least 50 (at room temperature and 0.5 MHz) with loss tangents or dissipation factors of less than 3% and preferably less than 1% are obtained with glass-ceramics of the present invention.

By use of the thermally crystallizable glasses of the present invention having a constant composition, each glass can, during an appropriate heat treatment process, be converted to a transparent, inorganic crystalline oxide ceramic material having any desired index of refraction between a selected upper and a selected lower limit. Furthermore, the ceramic material thus formed, also known as a glass-ceramic, exhibits a relatively high optical index of refraction and contains a major portion of very tiny crystals embedded in a minor glassy matrix remaining as a result of the thermal crystallization.

Furthermore, glass-ceramics of this invention can be prepared in the form of small chips, of a size of about ¼ inch and less, which are suitable for use as support carriers for electronic microcircuits, which chips have extremely high strengths and are difficult to break even after they have been first scribed with a diamond scribe. The strengths of such compositions are relatively high as compared to strengths of glass-ceramic chips having a composition outside of the present invention and which can usually be broken readily with one's fingers.

Within the broad spectrum of the alkali—$Ta_2O_5$—$SiO_2$ systems, it has been found that a narrow range of a compositions of the $Na_2O$—$Ta_2O_5$—$SiO_2$ system have good glass-forming properties when the three sole essential ingredients are within the following ranges:

| Ingredient | Mole Percent |
|---|---|
| $SiO_2$ | 37 – 55 |
| $Ta_2O_5$ | 23 – 35 |
| $Na_2O$ | 20 – 33 |

Glasses thus formed have a high index of refraction, and can be thermally in situ crystallized to mechanically strong, transparent glass-ceramics having a still higher index of refraction.

While the most of stable glasses are obtained when the ratio of $Na_2O$ to $Ta_2O_5$ is 1 slightly less than 1, it has been found that good glasses are also formed when the ratio of $Na_2O$ to $Ta_2O_5$ is from about 0.7:1 up to 1.2:1. When the $Ta_2O_5$ is present in a molar amount greater than the $Na_2O$, the glass-forming tendency of the composition is increased.

Several compositions were prepared by melting together silica, $Ta_2O_5$ and $Na_2O$ in the mole percents set forth in the following table.

TABLE I

| Ingredient | Mole Percent Compositions | | | | | | |
|---|---|---|---|---|---|---|---|
| | A | B | C | D | E | F | G |
| $SiO_2$ | 40 | 45 | 50 | 35 | 40 | 30 | 30 |
| $Ta_2O_5$ | 30 | 27.5 | 25 | 30 | 20 | 25 | 35 |
| $Na_2O$ | 30 | 27.5 | 25 | 35 | 40 | 45 | 35 |

Each of the compositions was heated to a temperature sufficient to melt the ingredients and then held at that temperature for about 1–24 hours, the time being dependent on the specific composition and how long it took for the melting to be completed and a homogeneous melt to be formed. The melt was periodically stirred during this time. Each molten composition was then poured onto a metal plate and another metal plate immediately placed over it to quench the composition. The glass-forming tendencies of each composition were then judged on the ability of the melt to be quenched into glass chips between the metal plates.

Compositions A, B and C, which come within the composition range of the invention, formed glasses readily, while compositions E, F and G having at least one ingredient outside the composition range of the invention, did not form any glass whatsoever. Composition D, which just outside the composition range, had very poor glass-forming qualities, and consequently the quenched plates had only small areas of glass.

As seen in FIG. 1 of the drawings, compositions A, B, and C come well within the glass formation area, while composition D is on the borderline and compositions E, F, and G are well outside such area. When each of compositions A–C was subjected to temperatures sufficient to first nucleate and then crystallize the glass, very good transparent glass-ceramics were obtained from the glass compositions A, B, and C. As seen in FIG. 2 of the drawing, composition D falls outside of the transparent glass-ceramic area as, of course, do compositions E, F and G. Glasses could not be formed from these latter three compositions, and composition D did not produce a glass which could be heat treated to form a glass-ceramic.

The following table sets forth the heat treatment schedules utilized in thermally in situ crystallizing the glasses to the glass-ceramics as claimed herein, and also shows the indices of refraction of the glasses and glass-ceramics.

TABLE II

| Properties and Treatment | Composition A | Composition B | Composition C |
|---|---|---|---|
| Index of Refraction (Glass) | 1.825 | 1.817 | 1.804 |
| Heat Treatment Temp. ° F (Time, hours) | 1570(16) 1675(1) 1725(¼) | 1625(2) 1750(2) | 1625(64) 1800(¼) |
| Index of Refraction (Glass-ceramic) | 1.895 | 1.884 | 1.858 |

$NaTaO_3$ was identified as the predominant crystal phase in the glass-ceramics obtained from the three compositions given above.

As evident in the above Table II, the index of refraction of the crystallizable glass is quite high and has it has been found that glasses as claimed in my copending application can be prepared having indices of refraction within the range of about 1.80 to 1.95. When the glasses are subjected to the crystallization schedule, the resultant glass-ceramics have a higher index of refraction, and preferably within the range of about 1.83 to 2.00.

The indices of refraction of the glasses and the glass-ceramics of the invention are much higher than comparable indices of refraction of $SiO_2$—$Na_2O$ glasses which have indices within the range of about 1.48 to 1.52. If CaO or BaO is incorporated in the $SiO_2$—$Na_2O$ glasses, the indices of refraction come within the ranges of about 1.5–1.56 and about 1.5–1.59 respectively. See *The Properties of Glass* by George W. Morey, Second Edition, 1954, published by Reinhold Publishing Corporation, New York, and particularly pages 378–382 thereof.

It is unexpected to find that thermally crystallizable glasses can be formed from the $Na_2O$—$Ta_2O_5$—$SiO_2$ system wherein each of the three sole essential ingredients comes within a critical range and furthermore that each of glasses has an index of refraction which is relatively higher than one would expect.

Also within the broad spectrum of the alkali-—$Ta_2O_5$—$SiO_2$ systems, it has been found that certain compositions of the $Na_2O$—$Li_2O$—$Ta_2O_5$—$SiO_2$ system coming within a narrow critical range also have good glass-forming properties, provided that each of the four essential ingredients is present within the following ranges:

| Ingredient | Mole Percent |
|---|---|
| $SiO_2$ | 27 – 45 |
| $Ta_2O_5$ | 30 – 45 |
| $Li_2O + Na_2O$ | 20 – 35 |

The molar ratio of $Li_2O$ to said $Na_2O$ is within the range of from 0.8:1 to 1.2:1 and the molar ratio of $Na_2O + Li_2O$ to $Ta_2O_5$ is within the range of 0.5:1 to about 1:1.

To show the criticality of having the glass-forming compositions come within the above ranges, a number of compositions were prepared by melting together silica, $Ta_2O_5$, $Li_2O$ and $Na_2O$ for a period of from 1 to 24 hours with constant stirring. Each of the compositions was then quenched between metal plates as discussed above with respect to the $Na_2O$—$Ta_2O_5$—$SiO_2$ compositions. The following compositions were prepared:

TABLE III

| Ingredients | Mole Percent Compositions | | | | | | | | | |
|---|---|---|---|---|---|---|---|---|---|---|
| | H | I | J | K | L | M | N | O | P | Q |
| $SiO_2$ | 40 | 30 | 30 | 30 | 35 | 35 | 40 | 20 | 30 | 30 |
| $Ta_2O_5$ | 30 | 35 | 40 | 45 | 35 | 40 | 40 | 40 | 25 | 50 |
| $Na_2O$ | 15 | 17.5 | 15 | 12.5 | 15 | 12.5 | 10 | 20 | 22.5 | 10 |
| $Li_2O$ | 15 | 17.5 | 15 | 12.5 | 15 | 12.5 | 10 | 20 | 22.5 | 10 |
| $n_D$ | 1.875 | 1.920 | 1.955 | | 1.914 | 1.945 | 19.34 | | | |

Glasses were formed from Compositions H through N inclusive, all of which come within the aforementioned critical range, while compositions O, P and Q, falling outside the critical composition range, did not form any glasses whatever. As may be seen in FIG. 3 of the drawing, compositions H through N inclusive fall within the glass-formation area, while compositions O, P and Q are outside of the defined area.

Figure 4:
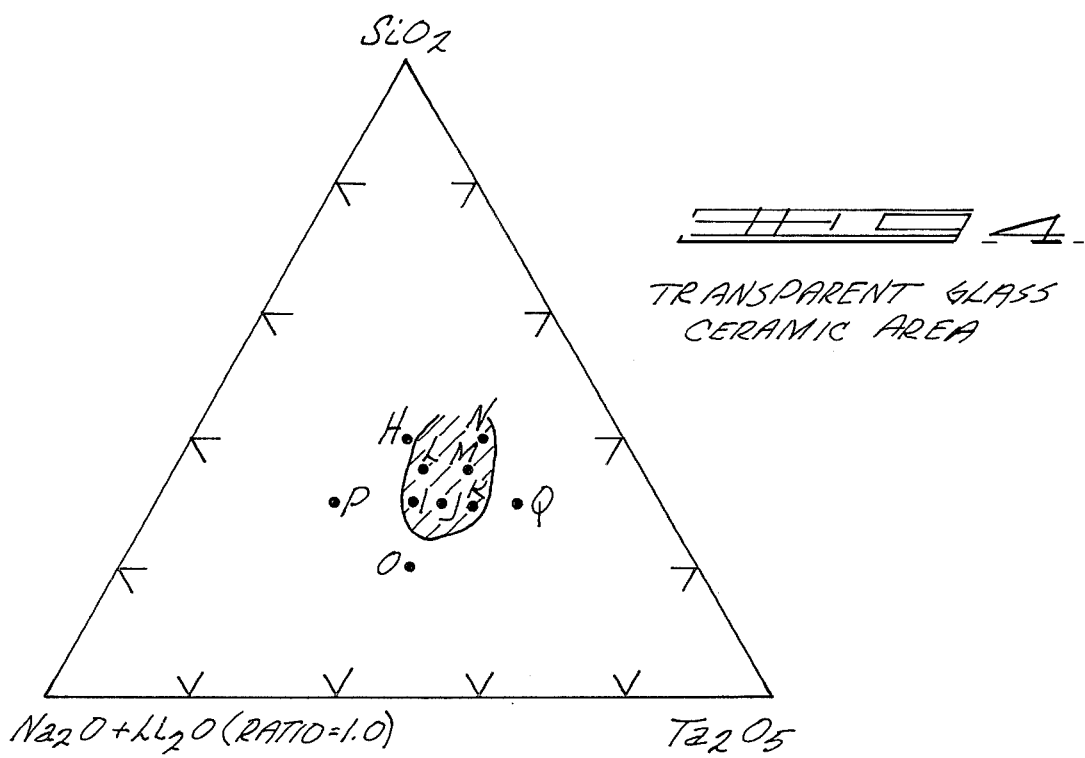

Of the glasses of compositions H through N inclusive, all were heat treated to form transparent glass-ceramics with the exception of the glass of compositions H. As seen in FIG. 4 of the accompanying drawing, composition H falls outside of the transparent glass-ceramic area. Thus, while the glasses of this embodiment of the invention come within the critical range set forth above, thermally crystallizable glasses and glass-ceramics made therefrom come within the following critical range:

| Ingredient | Mole Percent |
|---|---|
| $SiO_2$ | 27 – 45 |
| $Ta_2O_5$ | 32 – 45 |

-continued

| Ingredient | Mole Percent |
| --- | --- |
| $Li_2O + Na_2O$ | 20 – 35 |

The molar ratio of $Li_2O$ to said $Na_2O$ is within the range of from 0.8:1 to 1.2:1 and the molar ratio of $Na_2O + Li_2O$ to $Ta_2O_5$ is within the range of 0.5:1 to about 1:1.

Thus, when the $Ta_2O_5$ is less than 32 mole percent (it was present in an amount of 30 mole percent in composition H), the glass is not a thermally crystallizable glass and a glass-ceramic cannot be formed therefrom.

Glass compositions I, J, K, and L were subjected to the heat treatment schedule set forth in the following table whereby each of the glasses was thermally in situ crystallized to a transparent glass-ceramic. Various properties of the glasses and glass-ceramics are set forth in the following table:

TABLE IV

| | Compositions | | | | | | |
| --- | --- | --- | --- | --- | --- | --- | --- |
| | I | J | J | J | K | L | L |
| Heat Treatment Temp. ° F (Time,Hrs.) | 1550(2) 1675(½) | 1475(2) 1650(½) | 1475(2) 1600(¼) | 1400(2) 1950(¼) | 1625(2) 1750(¼) | 1470(2) 1500(1) | 1500(3) |
| Index of Refraction | | | | | | | |
| Glass | 1.920 | 1.955 | 1.955 | 1.955 | | 1.914 | 1.914 |
| Glass-Ceramic | 2.000 | 2.015 | | | 2.022 | 1.973 | 1.967 |
| Crystal Phase | $NaTaO_3$ | $NaTaO_3$ | | | $NaTaO_3$ | $NaTaO_3$ | |
| Dielectric Constant (Room temp.,0.5 MHz) | | | 62.5 | 85.5 | | | 66.3 |
| Dielectric Constant (Room temp,1.0 MHz) | | 99 | | | | | |
| Dissipation Factor % (Room temp.,0.5 MHz) | | | 0.8 | 0.8 | | | 0.68 |
| Dissipation Factor % (Room temp.,1.0 MHz) | | 0.75 | | | | | |
| Temp. Coefficient of Capacitance (−50° C. to 100° C) | | 0 | | | | | |

TABLE V

| | Glasses of Composition J | | | |
| --- | --- | --- | --- | --- |
| | No. 1 | No. 2 | No. 3 | No. 4 |
| Heat Treatment Temp. ° F,(Time,hrs) | 1425(2) | 1475(2) | 1475(2) 1500(½) | 1475(2) 1650(½) |
| Index of Refraction | | | | |
| Glass | 1.955 | 1.955 | 1.955 | 1.955 |
| Glass-Ceramic | 1.962 | 2.004 | 2.005 | 2.015 |

These high indices of refraction for the glasses and glass-ceramics, exemplified in Tables IV and V, are considerably higher than the indices of refraction of the $Li_2O$—$Na_2O$—$SiO_2$ glasses which fall within the range of about 1.5 to 1.54 according to Morey, *The Properties of Glass*, supra.

While the glasses and glass-ceramics of the invention have been discussed in terms of the sole essential ingredients, it will be evident to those skilled in the art that minor amounts preferably not more than 10% and most $NaTaO_3$ was identified as a predominant crystal phase in glass-ceramics formed from the compositions given above. $LiTaO_3$ and an unidentified phase are sometimes present as another crystal phase in the glass-ceramics.

Again, as is evident from the above table, the index of refraction of the crystallizable glass is quite high, coming within the range of 1.85–2.0. When crystallized to a glass-ceramic, the index is even higher and preferably comes within the range of about 1.90 to 2.10.

Glass-ceramics of the invention as claimed herein coming within the $Na_2O$—$Li_2O$—$Ta_2O_5$—$SiO_2$ system also have high dielectric constants of at least 50 and preferably as high as 100 or more. Moreover, such glass-ceramics have a dielectric loss or dissipation factor of less than 3% and preferably less than 1%.

While each of the glasses and glass-ceramics of this system has a very high index of refraction, the index of each glass-ceramic can be varied to a desired figure by varying the heat-treatment schedule when thermally in situ crystallizing the glasses. The amount of increase in the index is dependent upon the heat treatment. This can be seen from the following table wherein the glass of composition J referred to above was subjected to different heat-treating schedules, so that the index of refraction in the final product differed, depending upon the temperature and the times. The heat treatment and the resulting indices of refraction imparted to the resulting glass-ceramics are shown in the following table:

preferably no more than 5% by weight of other metal oxides which are compatible with the glass and glass-ceramic compositions can be used. Care should be taken, however, to insure that such other metal oxides do not materially affect the basic characteristics of the glasses and glass-ceramics of the present invention, including high indices of refraction, high dielectric constants, low dielectric losses, and high relative strengths.

Furthermore, while the glass-ceramics of the invention have been disclosed as being transparent, so that they can be used in many devices where transparency is important, it will be appreciated that if only the high dielectric constant of the glass-ceramic together with its relatively high strength is required, the glass-ceramic can be further heat-treated to form an opaque glass-ceramic.

Transparent glass-ceramics having two or more indices of refraction can be prepared by subjecting different portions of the thermally crystallizable glass to the particular different heating schedules which produce the desired refraction indices. Thus, a crystallizable glass article of Composition J could have one portion subjected to heat schedule No. 1 of Table V and another portion subjected to heat schedule No. 4 of the same Table. The resulting transparent glass-ceramic article would have an index of refraction of 1.962 along the first portion and an index of 2.015 along the second portion.

Lenses, including eyeglass lenses, which are normally convex at one surface, can be made from flat sheets of transparent glass-ceramic wherein the center of the sheet or lens has a certain index of refraction and a number of concentric areas around the center are given different indices of refraction by subjecting such areas to the requisite heat schedules so that the indices of refraction are in ascending or descending magnitudes from the center to the outer periphery of the lens. Thus, using Composition J and the heat treatments set forth in Table V, the center of the transparent glass-ceramic lens of this composition J can have an index of refraction of 2.015 and the three concentric areas around the center can have indices of refraction of 2.005, 2,004, and 1.962, respectively. By utilizing an appropriate temperature gradient from the center to the edge, a smooth and continuous variation of the index of refraction from the center to the edge can be achieved. Changing the temperature gradient will change the resulting index of refraction gradient. This is an advantage over the Fresnel type lens where discrete changes in the index are achieved by gluing together glasses having different indices. Means for applying the gradient temperature to the thermally crystallizable glass are known in the art. Such lenses can be made to produce the same refraction of light rays as presently obtained by grinding the surface of a piece of glass to shape a particular lens. By combining grinding and the index of refraction gradient, even greater refraction of light can be obtained than by utilizing either the grinding or the index gradient alone. The process of imparting concentric indices of refraction to a thermally crystallizable glass to form a glass-ceramic article can be applied to a number of such glass articles, including transparent telescope mirror blanks which are made of glass-ceramic.

Another important application of this embodiment of the invention is in optical circuitry. By heat-treating a glass block or article so as to form a path of any desired shape and configuration within said block, with the glass-ceramic defining such a path having a particular higher index of refraction than the surrounding material, light can be made to follow such a path and can be bent as it travels about such a path. Thus, optical printed circuits can be readily made.

For example, a laser beam can be used to heat treat a particular spot within a thermally crystallizable glass block or chip and cause that portion of the block to form a glass-ceramic having a particular index of refraction. As the laser beam moves along the block, a narrow path defined by a glass-ceramic having a particular index of refraction is formed, since the heat of the laser beam is localized. The index is higher than that of the surrounding glass and light moving along the path stays within the path.

While glasses of the present invention, namely, those within the particular $Na_2O$—$Ta_2O_5$—$SiO_2$ and $Na_2O$—$Li_2O$—$Ta_2O_5$—$SiO_2$ systems are suitable for purposes of forming transparent glass-ceramics having a plurality of indices of refraction, other thermally crystallizable glasses can be used including those within the $Na_2O$—$K_2O$—$Nb_2O_5$—$SiO_2$ system, $K_2O$—$Nb_2O_5$—$SiO_2$ system ($Na_2O$, $Li_2O$, $K_2O$)—$Nb_2O_5$—$Ta_2O_5$—$GeO_2$ systems and $SiO_2$—$Al_2O_3$—$Li_2O$ systems. An example of a thermally crystallizable glass coming within the latter system is as follows, with amounts expressed in weight percent:

| | |
|---|---|
| $SiO_2$ | 66.9 |
| $Al_2O_3$ | 20.9 |
| $Li_2O$ | 3.9 |
| $TiO_2$ | 1.8 |
| $ZrO_2$ | 2.0 |
| $CaO$ | 3.5 |
| $Na_2O$ | 0.7 |
| $Sb_2O_3$ | 0.3 |

Many glasses coming within the latter system and forming transparent glass-ceramics are known in the prior art.

An example of the glasses coming within the $K_2O$—$Nb_2O_5$—$SiO_2$ system suitable for forming glass-ceramics having an index of refraction gradient is as follows:

| Ingredient | Mole Percent |
|---|---|
| $SiO_2$ | 55 |
| $Nb_2O_5$ | 22.5 |
| $K_2O$ | 22.5 |

The batch ingredients for a 5 kg melt were melted in a crucible at a temperature of 2200° F for 24 hours, quenched in water and then remelted and quenched several times. The last remelt was held at the temperature of 2200° F for 5 hours. The crucible containing the molten glass was then placed within an insulated fire brick which had been previously cut to provide an opening at the bottom thereof to permit the underside of the crucible to extend therethrough. The fire brick and crucible were then placed on a 1-inch thick steel plate which had been preheated to a temperature of 900° F with the fire brick being supported on ⅛ inch thick blocks and the undersurface of the crucible in contact with the steel plate. The top of the crucible was covered with quartz felt and the molten glass was permitted to cool to 1200° F. The steel plate, fire brick and crucible were then placed in an annealing furnace having a temperature of 1180° F for about a half hour, at the end of which time the furnace was turned off and the glass permitted to cool to ambient temperature at furnace rate.

The annular transparent glass ceramic which had formed had a radial index of refraction gradient. While the index of refraction was 1.767, it varied in a regular manner from the center to the edge with a difference in the index of −0.002. Very good radial symmetry was observed with respect to the index of refraction gradient.

Having fully described the invention, what is claimed is:

1. A transparent glass-ceramic formed by in situ crystallization of a crystallizable base glass consisting essentially of about 37–55 mole percent $SiO_2$, 23–35 mole percent $Ta_2O_5$ and 20–33 mole percent $Na_2O$, said transparent glass-ceramic containing $NaTaO_3$ as the predominant crystalline phase.

2. The transparent glass-ceramic as defined in claim 1 wherein the molar ratio of $Na_2O$ to $Ta_2O_5$ is about 1.

3. The transparent glass-ceramic as defined in claim 1 wherein the molar ratio of $Na_2O$ to $Ta_2O_5$ is within the range of about 0.7:1 to about 1.2:1.

4. The transparent glass-ceramic as defined in claim 1 wherein said glass-ceramic has an index of refraction of at least 1.83.

5. The transparent glass-ceramic as defined in claim 4 wherein said glass-ceramic has an index of refraction within the range of about 1.83 to 2.00.

6. A transparent glass-ceramic formed by in situ crystallization of a crystallizable base glass consisting essentially of about 27–45 mole percent $SiO_2$, 32 to 45 mole percent $Ta_2O_5$ and 20–35 mole percent $Li_2O$ plus $Na_2O$ wherein the molar ratio of said $Li_2O$ to said $Na_2O$ is within the range of from 0.8:1 to 1.2:1 and the molar ratio of $Na_2O$ plus $Li_2O$ to $Ta_2O_5$ is within the range of from 0.5:1 to about 1:1, said transparent glass-ceramic containing $NaTaO_3$ as the predominant crystalline phase.

7. The transparent glass-ceramic as defined in claim 6 wherein the molar ratio of $Li_2O$ to $Na_2O$ is about 1 and the molar ratio of $Na_2O + Li_2O$ to $Ta_2O_5$ is about 0.7.

8. The transparent glass-ceramic as defined in claim 6 wherein said glass-ceramic has an index of refraction of at least 1.9.

9. The transparent glass-ceramic as defined in claim 7 wherein said glass-ceramic has an index of refraction within the range of 1.9 to 2.10.

10. The transparent glass-ceramic as defined in claim 6 wherein said glass-ceramic has a dielectric constant of at least 50 (room temp., 0.5 MHz) and a dielectric loss of less than 3%.

11. The transparent glass-ceramic as defined in claim 10 wherein said glass-ceramic has a dielectric constant within the range of 50 to about 100 (room temp., 0.5 MHz) and a dielectric loss of less than 1%.

* * * * *

UNITED STATES PATENT OFFICE
CERTIFICATE OF CORRECTION

Patent No. 4,017,317     Dated April 12, 1977

Inventor(s) James E. Rapp

It is certified that error appears in the above-identified patent and that said Letters Patent are hereby corrected as shown below:

Delete the drawing on the cover sheet and insert the drawing as shown on the attached sheet.

Signed and Sealed this

*Eighteenth* Day of *October 1977*

[SEAL]

*Attest:*

RUTH C. MASON
*Attesting Officer*

LUTRELLE F. PARKER
*Acting Commissioner of Patents and Trademarks*

Page 2 of 2

UNITED STATES PATENT OFFICE
CERTIFICATE OF CORRECTION

Patent No. 4,017,317      Dated April 12, 1977

Inventor(s) James E. Rapp

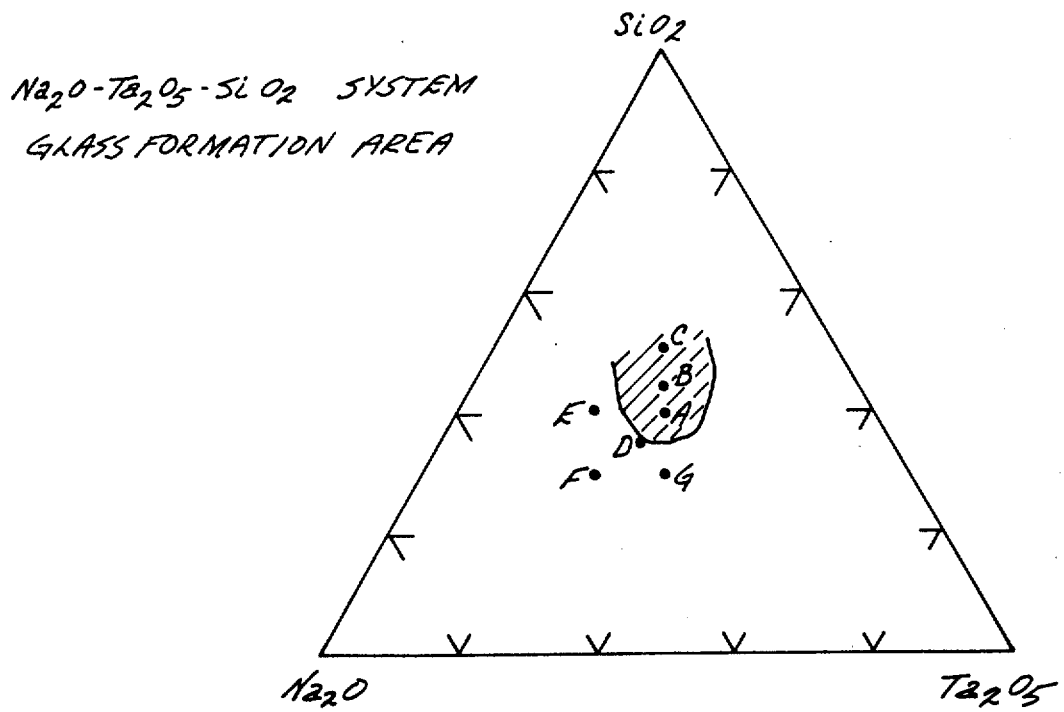

It is certified that error appears in the above-identified patent and that said Letters Patent are hereby corrected as shown below: